United States Patent

[11] 3,633,735

[72] Inventors Desmond Walter Molins;
David Theodore Nelson Williamson; Alan Keith McCombie; Horace Alexander Stone, all of London, England
[21] Appl. No. 871,390
[22] Filed July 23, 1969
[45] Patented Jan. 11, 1972
[73] Assignee Molins Machine Company, Limited
Original application Oct. 22, 1968, Ser. No. 778,357, now Patent No. 3,495,696, which is a continuation of application Ser. No. 676,657, Oct. 19, 1967, now abandoned, which is a continuation of application Ser. No. 561,547, June 29, 1966, now abandoned. Divided and this application July 23, 1969, Ser. No. 871,390

[54] APPARATUS FOR FEEDING CIGARETTES OR OTHER RODLIKE ARTICLES
5 Claims, 3 Drawing Figs.
[52] U.S. Cl..................................................... 198/82, 198/102
[51] Int. Cl..................................................... B65g 37/00
[50] Field of Search........................................... 198/32, 35, 37, 82, 20 C, 102; 222/55; 53/148; 131/21 B, 21 D

[56] References Cited
UNITED STATES PATENTS
| 2,142,271 | 1/1939 | Herrmann | 198/20 C |
| 2,966,253 | 12/1960 | Gerrans | 198/37 |
| 3,297,138 | 1/1967 | McCombie | 53/148 X |

Primary Examiner—Edward A. Sroka
Attorney—Craig, Antonelli & Hill

ABSTRACT: The speed of an endless band conveying a stack of rodlike articles aligned parallel to one another and moving transversely to their axes is regulated by means of a flap which partly defines a channel for the stack of articles and moves up and down in response to the variable pressure of the articles beneath it. Two endless bands one above the other and each carrying a stack of the articles may convey the two stacks to a merger zone lying above a third endless band which carries the merged stack with the aid of a top wall confining the upper surface of the merged stack.

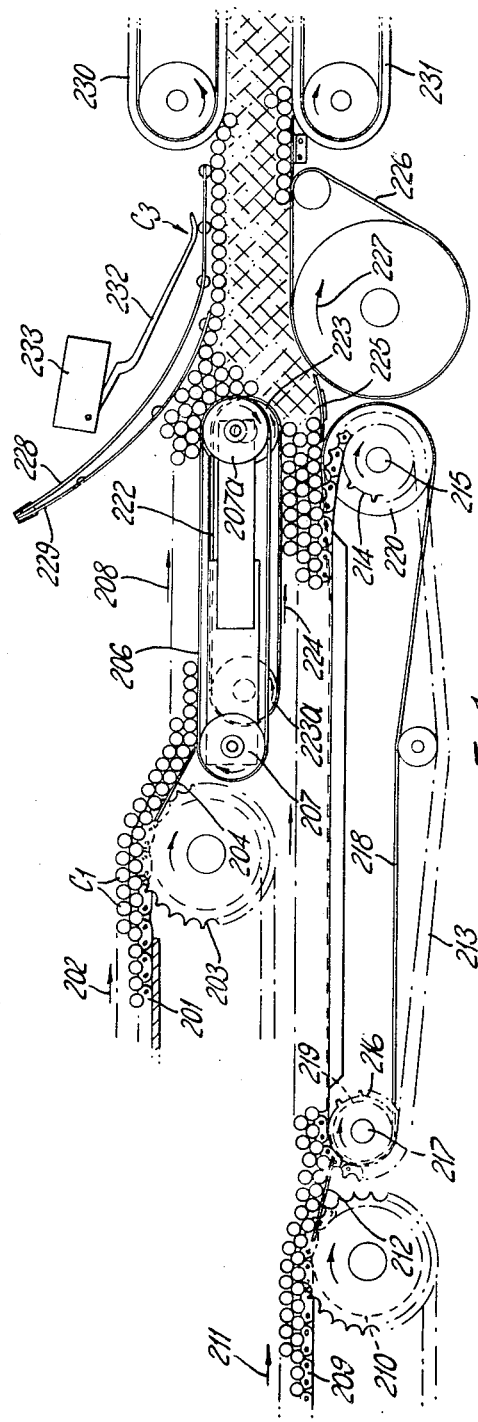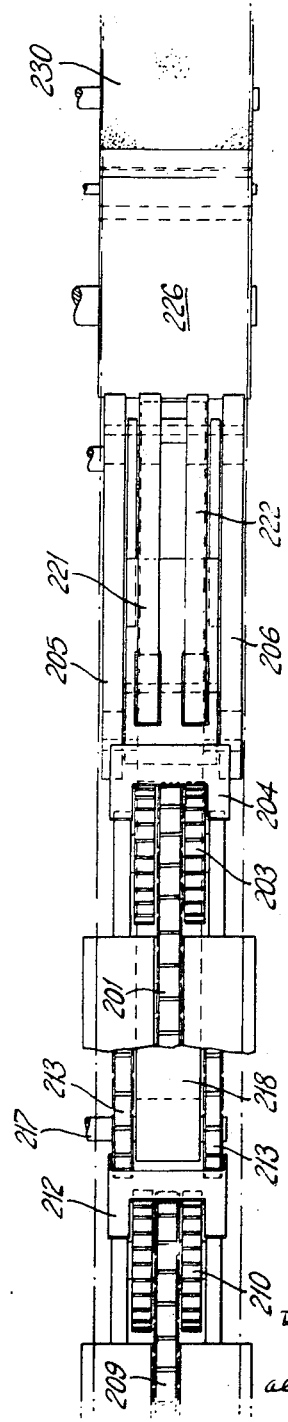

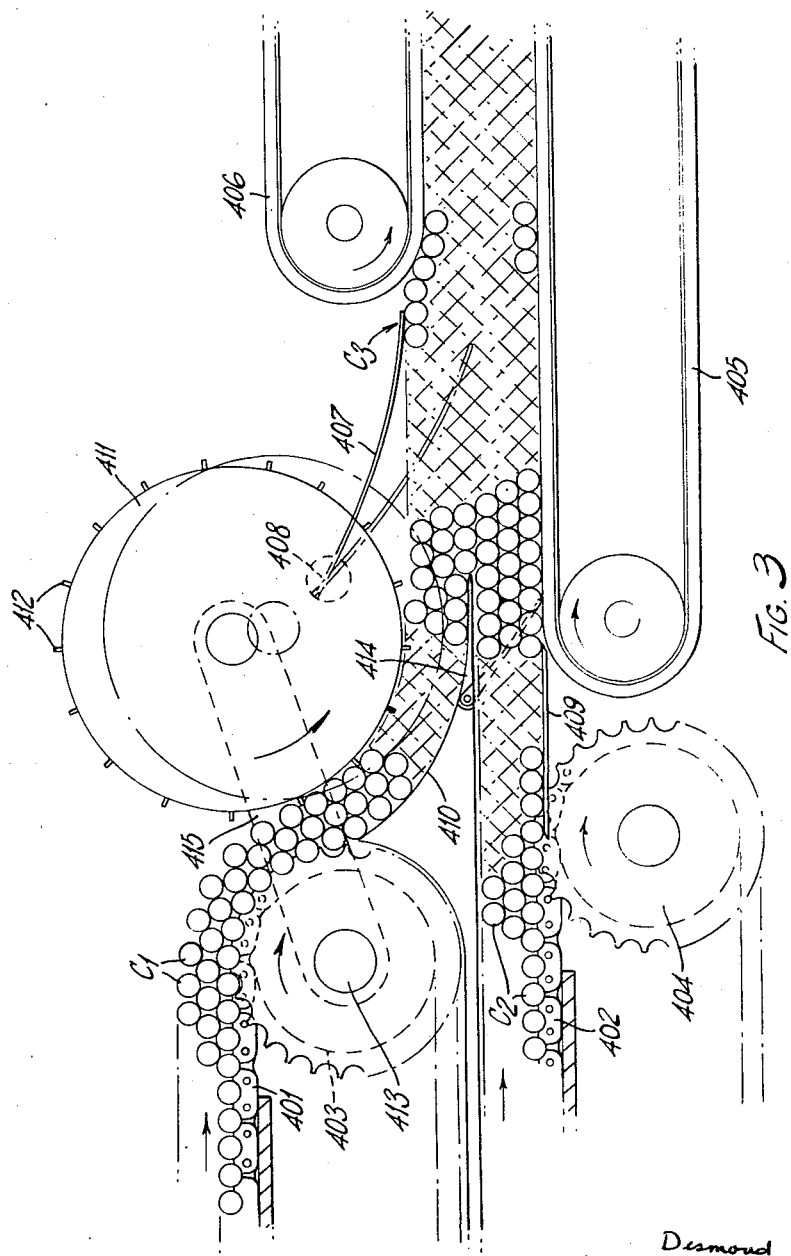

APPARATUS FOR FEEDING CIGARETTES OR OTHER RODLIKE ARTICLES

This is a division of our copending application Ser. No. 778,357 filed Oct. 22, 1968, now U.S. Pat. No. 3,495,696, which is a continuation of our copending application Ser. No. 676,657 filed Oct. 19, 1967 (now abandoned), which is in turn a continuation of our copending application Ser. No. 561,547 filed June 29, 1966 (now abandoned).

This invention is concerned with conveyor systems for cigarettes and other rodlike articles.

More specifically the invention is concerned with the conveying of stacks of rodlike articles aligned parallel to one another and moving transversely to their axes. One aspect of the invention concerns controlling the speed of an endless band conveying the articles, this being done by means of a flap which partly defines a channel for the stack of articles and moves up and down in response to the pressure of the articles beneath it. The second aspect of this invention concerns the merging of two stacks carried by separate endless bands, one above the other, the arrangement being such that the two stacks are conveyed to a merger zone lying above a third endless band which carries further the merged stack with the aid of a top wall confining the upper surface of the merged stack.

The term "stack" in this context means a stream of at least two rows of cigarettes.

An example of apparatus according to this invention is shown in the accompanying drawings in which:

FIG. 1 is a side view of one embodiment of cigarette-feeding apparatus;

FIG. 2 is a plan view of the apparatus of FIG. 1; and

FIG. 3 is an alternative embodiment to that of FIG. 1.

As shown in FIGS. 1 and 2, a stack of cigarettes $C_1$ is conveyed from a cigarette source by a first conveyor, being a single chain conveyor 201, which is driven in the direction of arrow 202 by a sprocket 203. A sloping plate 204 ploughs them from the conveyor 201 and delivers them in an orderly array on the upper run of a top set of parallel conveyor bands 205 and 206 which are driven by a pulley 207 in the direction of arrow 208.

A stack of cigarettes $C_2$ form a further source is conveyed by a chain conveyor 209 which is driven by a sprocket 210 in the direction of arrow 211. A sloping plate 212 ploughs them from the conveyor 209 and deposits them on a double chain conveyor 213 driven by sprockets 216 keyed to a shaft 217. The conveyor 213 passes around sprockets 214 keyed to a shaft 215. Between the double chains of the conveyor 213 is a wide band 218 which is driven by a pulley 219 keyed to the shaft 217 and which returns about a tail pulley 220 mounted freely on the shaft 215. The pulley 219 is of smaller effective diameter than the sprockets 214. This arrangement is such that the band 218 lifts the stack of cigarettes $C_2$ out of the link recesses of the double chain conveyor 213 as they approach the end of the conveyor's run. At the same time they are lifted into contact with the lower run of a lower set of bands 221 and 222 driven by a pulley 223 in the direction of arrow 224 and passing around idlers 223a. The lifting movement is assisted by a bridge member 225, which acts in concert with the upward sweep of the bands 221 and 222 as they wrap around the pulley 223, to deliver the stack of cigarettes $C_2$ to a merger zone above a conveyor 226 which is driven in the direction of arrow 227.

The cigarette stack $C_1$ joins the cigarette stack $C_2$ to form a merged stack $C_3$ which is then carried further by the conveyor 226. The cigarette stack $C_1$ is directed downwardly onto the cigarette stack $C_2$ not only by gravity but by the downward sweep of the bands 205 and 206 as they wrap around their idling pulley 207a, and are controlled so that they do not become misaligned by flaps 228 and 229 which are pliable and weighted. In other words, the flaps 228 and 229 act as top walls which confine the upper surface of the stack.

Top and bottom band conveyors 230 and 231 remove the merged stack of cigarettes $C_3$ at a controlled rate, their speed being regulated by a mechanism 233 controlled by a lever 232 resting on the horizontal part of the flap 228.

In FIG. 3 cigarette stacks $C_1$ and $C_2$ from two sources, i.e., from two continuous rod cigarette-making machines are delivered in the same direction by similar conveyors 401 and 402 passing around idlers 403 and 404 respectively to a merger zone forming a resultant stack $C_3$ on a second conveyor 405. Cooperating with the second conveyor 405 is a superimposed conveyor 506 which together feed the resultant stack $C_3$ into tray-filling apparatus, their speed being determined by the position of a detector arm 407 which is pivoted at 408. The cigarette stack $C_2$ passes from conveyor 402 to conveyor 405 by means of a bridge member 409.

The cigarette stack $C_1$ is directed down a concave slope 410 by a drum 411 provided with small paddles 412. The drum 411 is simply driven from shaft 413, to which is fixed the idler 403, so that its peripheral speed is the same as the speed at which the cigarette stacks $C_1$ and $C_2$ move along their respective paths. The drum 411 is also held on an arm 415 pivotable about the axis of the shaft 413. At the lower end of the concave slope 410 is hinged a flap 414. With both cigarette machines in production, i.e., with the cigarette stacks $C_1$ and $C_2$ both flowing normally, the flap 414 will be in a horizontal position as shown in full lines in FIG. 3. If the flow of cigarette stack $C_2$ ceases, the flap 414 will fall into the position shown in dotted lines and will thereby prevent cigarettes in stack $C_1$ from moving backwards onto the bridge 409.

The apparatus of this invention provides an improved conveyor system whereby rodlike articles such as cigarettes issuing from at least two sources may be combined together. To compensate for fluctuations from time to time in the quantity of cigarettes being supplied by either of the conveyors to the merger zone and at the same time to confine the upper surface of the merged stack, flap means is provided which is movable up and down in response to the variable pressure of the articles beneath it for regulating the speed of the endless band carrying the merged stack.

We claim:

1. Apparatus for merging two stacks of rodlike articles aligned parallel to one another and moving transversely to their axes, comprising two endless bands mounted one above the other for respectively carrying the two stacks directly into a merger zone lying above a third endless band which carries further the merged stack, top wall means for confining the upper surface of the merged stack as it leaves the merger zone, and including control means responsive to the rate of delivery of articles from the merger zone for regulating the speed at which said articles are conveyed from the merger zone by the third endless band.

2. Apparatus according to claim 1 wherein the means for regulating the speed at which articles are conveyed are controlled by a flap confining the upper surface of the merged stack at the merger zone.

3. Apparatus according to claim 1 wherein said top wall means comprises a fourth endless band the lower run of which travels in the same direction as the run of the third endless band supporting the merged stack.

4. Apparatus for merging two stacks of rodlike articles aligned parallel to one another and moving transversely to their axes, comprising two endless bands mounted one above the other for respectively carrying the two stacks to a merger zone lying above a third endless band which carries further the merged stack, and including top wall means for confining the upper surface of the merged stack as it leaves the merger zone, at least one of the endless bands carrying a stack of articles towards the merger zone having a cooperating parallel top wall for confining the upper surface of the stack on said one band.

5. Apparatus according to claim 4 wherein said cooperating parallel top wall comprises a further endless band the lower run of which travels in the same direction as the surface of said one band supporting a stack of articles being conveyed towards the merger zone.